(12) United States Patent
Patanella

(10) Patent No.: US 9,183,037 B2
(45) Date of Patent: Nov. 10, 2015

(54) AUTOMATED ADMINISTRATION USING COMPOSITES OF ATOMIC OPERATIONS

(71) Applicant: Oracle International Corporation, Redwood Shores, CA (US)

(72) Inventor: Guido Patanella, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/729,475

(22) Filed: Dec. 28, 2012

(65) Prior Publication Data

US 2013/0227577 A1  Aug. 29, 2013

Related U.S. Application Data

(63) Continuation of application No. 12/578,706, filed on Oct. 14, 2009, now Pat. No. 8,347,294.

(51) Int. Cl.
*G06F 9/46* (2006.01)
*G06F 9/50* (2006.01)

(52) U.S. Cl.
CPC .............. *G06F 9/46* (2013.01); *G06F 9/5038* (2013.01)

(58) Field of Classification Search
None
See application file for complete search history.

(56) References Cited

U.S. PATENT DOCUMENTS

| | | | |
|---|---|---|---|
| 5,493,682 A | 2/1996 | Tyra et al. | 717/122 |
| 5,805,891 A | 9/1998 | Bizuneh et al. | 717/121 |
| 6,944,848 B2 | 9/2005 | Harman et al. | 717/124 |
| 2002/0174093 A1* | 11/2002 | Casati et al. | 707/1 |
| 2007/0011281 A1 | 1/2007 | Jhoney et al. | 709/220 |
| 2008/0028396 A1 | 1/2008 | Stich et al. | 717/177 |
| 2008/0115135 A1* | 5/2008 | Behnen et al. | 718/101 |
| 2009/0144120 A1* | 6/2009 | Ramachandran | 705/9 |
| 2009/0172769 A1* | 7/2009 | Bobak et al. | 726/1 |

OTHER PUBLICATIONS

Reichert et al. Dealing with forward and backward jumps in workflow management systems. [online] (Jan. 8, 2003). Springer-Verlag., pp. 37-58. Retrieved From the Internet <http://dbis.eprints.uni-ulm.de/176/1/RDB03.pdf>.*

(Continued)

*Primary Examiner* — Emerson Puente
*Assistant Examiner* — Jonathan R Labud
(74) *Attorney, Agent, or Firm* — Campbell Stephenson LLP

(57) ABSTRACT

Various techniques for automatically administering software systems using composites of atomic operations are disclosed. One method, which can be performed by an automation server, involves accessing information representing an activity that includes a first operation and a second operation. The information indicates that the second operation processes a value that is generated by the first operation. The method generates a sequence number as well as an output structure, which associates the sequence number with an output value generated by the first operation, and an input structure, which associates the sequence number with an input value consumed by the second operation. The method sends a message, via a network, to an automation agent implemented on a computing device. The computing device implements a software target of the first operation. The message includes information identifying the first operation as well as the output structure.

20 Claims, 9 Drawing Sheets

(56) References Cited

OTHER PUBLICATIONS

Hearnden, David et al., Automating Sofware Evolution, IEEE Computer Society, Proceedings of the 7$^{th}$ International Workshop on Principles of Software Evolution (IWPSE '04), Sep. 6, 2004, 6 pages.

Moha, Naouel, Detection and Correction of Design Defects in Object-Oriented Architectures, http://www.ecoop.org/phdoos/ecoop2006ds/ds/moha.pdf, Research Group on Open, Distributed Systems, Experimental Software Engineering, Jul. 30, 2006, 4 pages.

Verhoef, Chris, Software Evolution: A Taxonomy, University of Amsterdam, Programming Research Group Kruislaan 403, 1098 SJ Amsterdam, The Netherlands, 2004, 5 pages.

Canfora, Gerardo et al., Software Maintenance, University of Sannio, Faculty of Engineering at Beneveto, Nov. 29, 2000, pp. 1-33.

Liu, Yanhong A., Efficient Computation Via Incremental Computation, Indiana University, Computer Science Department, Dec. 1999, pp. 1-24.

* cited by examiner

| ASO Identifier 300 | Effect(s) 305 |

| Input Structure 405 | ASO Identifier 300 | Output Structure 410 |

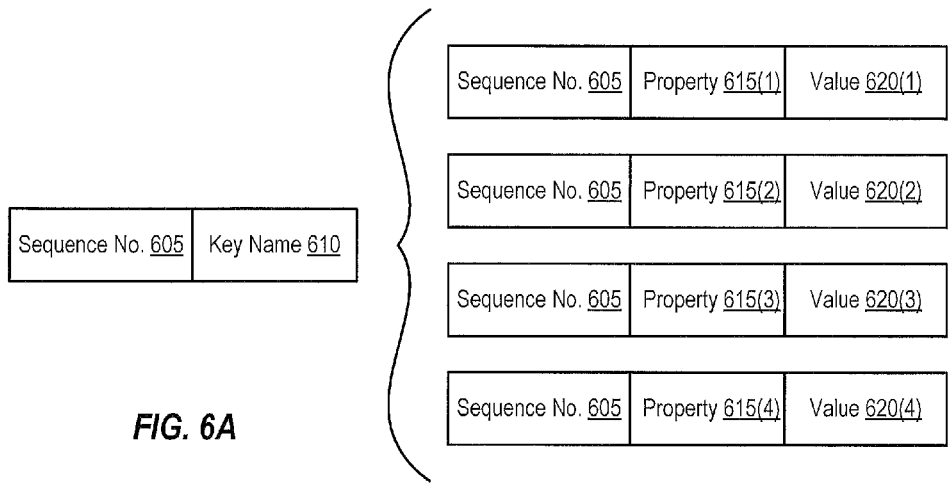
*FIG. 6A*
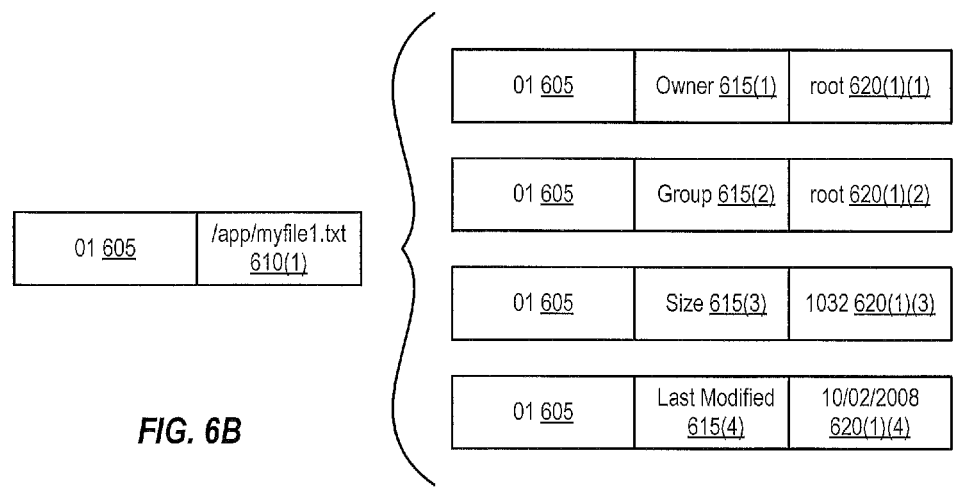
*FIG. 6B*
| | Owner 615(1) | Group 615(2) | Size 615(3) | Last Modified 615(4) |
|---|---|---|---|---|
| /app/myfile1.txt 610(1) | root 620(1)(1) | root 620(1)(2) | 1032 620(1)(3) | 10/02/2008 620(1)(4) |
| /app/myfile2.txt 610(2) | root 620(2)(1) | root 620(2)(2) | 1211 620(2)(3) | 1/23/2009 620(2)(4) |
| /app/myfile2.txt 610(3) | root 620(3)(1) | root 620(3)(2) | 896 620(3)(3) | 3/01/2009 620(3)(4) |
*FIG. 7*

AUTOMATED ADMINISTRATION USING COMPOSITES OF ATOMIC OPERATIONS

CROSS-REFERENCE TO RELATED APPLICATIONS

This application is a continuation of U.S. patent application Ser. No. 12/578,706, entitled "Automated Administration Using Composites of Atomic Operations," filed Oct. 14, 2009 and issued as U.S. Pat. No. 8,347,294, and naming Guido Patanella as the inventor. This application is assigned to Oracle International Corporation, the assignee of the present invention, and is hereby incorporated by reference in its entirety and for all purposes as if completely and fully set forth herein.

FIELD OF THE INVENTION

This invention relates to administration of software systems and, more particular, to automating administration of software systems in data centers.

DESCRIPTION OF RELATED ART

Software systems require constant administrative effort to maintain, especially in large computing environments such as data centers. Administrative tasks involve maintaining installed software binaries, configuring installed software, preserving existing configurations over time, and maintaining operating system software. Specific examples of such tasks include installing and upgrading software, performing an initial software configuration, performing maintenance for an existing software configuration, removing software, configuring an operating system for use with particular hardware and/or for particular networking purposes, configuring software for scope of performance and operating improvements, migrating software within and outside existing computer hardware, provisioning software, implementing database system data definition changes and performing database system manipulation, and the like. Administrative tasks like these are often performed by human administrators, who may use system commands and/or scripts, and/or by intermediate software systems with automation capabilities.

Existing automation systems are typically designed to perform specific tasks by executing program code, such as scripts or executable commands. This automation program code typically does not offer a high level of reliability and portability. For example, an automation program may be designed to use copy commands to copy a series of software files from one location to another. The design of the automation program may assume that the commands will be successful. Subsequently executed automation program code may also rely on that assumption. Thus, if one of the files cannot be copied successfully, the automation program may perform unreliably or even cease functioning. Given the many execution assumptions like these that may be present, such automation programs may require extensive administrator intervention for operation and validation. The need for such administrative intervention can be a major cost in a data center and may even impact the reliability of services offered by the data center.

There are many other limitations associated with many of the existing automation programs. For example, any changes, regardless of how small, to automation programs generally require extensive testing. This requirement arises because automation programs are usually designed to run in a variety of different computing environments and/or be invoked by many different types of software, and testing must be performed for each computing environment and/or type of software. Additionally, error handling needs to be repeated throughout all automation programs, increasing its maintenance complexity. There is no guarantee that error handling exists for each aspect of the automation program.

An additional limitation arises because automation programs are designed to satisfy particular technical objectives, which may not directly correlate to the functionality of the automation programs. This can make it difficult for administrators, especially those without significant technical knowledge, to interact with automation programs from a functional request standpoint. This may also make automation programs difficult to maintain.

Additionally, in both automated and non-automated environments, proper authorization for administrative tasks depends on the understanding of the actions of execution. If the administrator or automation program performing an administrative task fails to properly understand the effects of the administrative task, the administrator or automation program may fail to obtain the needed authorization to perform the maintenance task, which can in turn cause problems for users or customers. An erroneous authorization may be caused by not properly understanding the business impact of specific actions. For example, an administrator can ask a manager for the authorization to execute a script that will "patch" a software system on a server. The manager approves the activity to be executed, without being fully aware of what actions are involved in "patching" the software system. The administrator then patches the software system, which actually involves stopping processes on the server, deploying and installing the patch, and finally restarting the server. This patching activity requires several hours downtime on a production system that affects a high profile customer. The customer had previously indicated that the customer would not accept downtimes that month. Unfortunately, since the manager was not aware that the "patch" required downtime, the authorization was erroneously granted and the customer's requirement of no downtime was not met.

As the above examples illustrate, existing techniques for administering software systems are often limited. Accordingly, improved techniques are desired.

BRIEF DESCRIPTION OF THE DRAWINGS

The present invention may be better understood, and its numerous objects, features and advantages made apparent to those skilled in the art by referencing the accompanying drawings.

FIG. 6A shows how sequence numbers can be included in input and output structures included in messages exchanged between automation servers and automation agents, according to one embodiment of the invention.

FIG. 6B illustrates how specific values can be included in the structure shown in FIG. 6A, according to one embodiment of the invention.

FIG. 7 illustrates how automation server can use sequence numbers to keep track of values generated by performing the same atomic service operation in different tasks, according to one embodiment of the invention.

Figure 1:
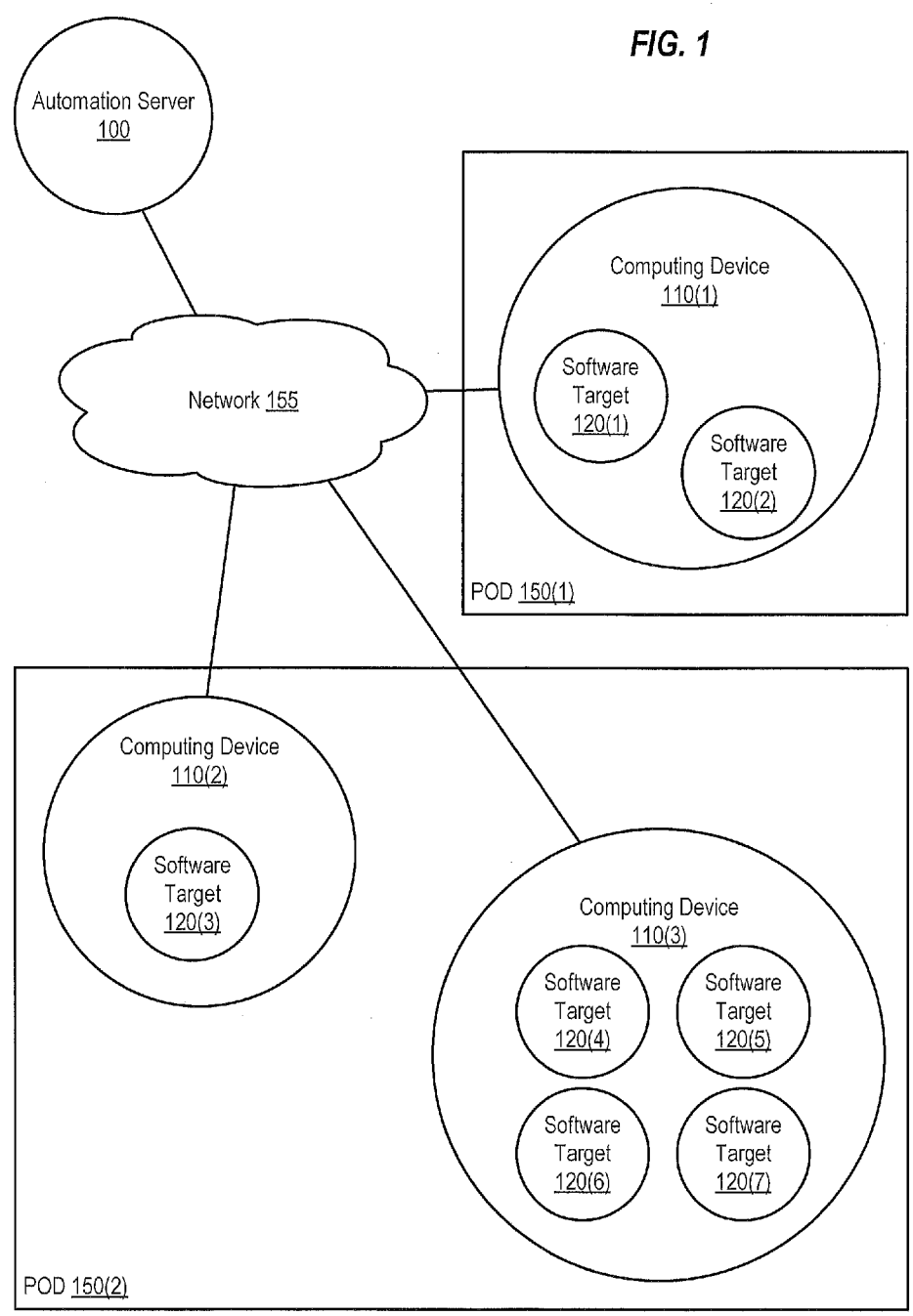
FIG. 1 is a block diagram of a software system that includes an automation server configured to automatically perform administration tasks, according to one embodiment of the invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a software system that includes an automation server configured to automatically perform administration tasks using composites built from atomic administration operations. As show, the software system includes an automation server 100 that is coupled to two purpose-oriented domains (PODs) 150(1) and 150(2) by a network 155. Each POD includes one or more computing devices, which in turn each implement one or more software targets. For example, POD 150(1) includes computing device 110(1), which implements two software targets 120(1) and 120(2). Similarly, POD 150(2) includes computing device 110(2) and computing device 110(3). Computing device 110(2) implements software target 120(3), while computing device 110(3) implements software targets 120(4), 120(5), 120(6), and 120(7).

In FIG. 1, each computing device 110(1)-110(3) is a device that is configured to execute software. Such computing devices can include personal computers, server computers, cellular phones, personal digital assistants, set-top boxes, network appliances, and the like. In the example of FIG. 1, the computing devices are coupled by a network 155. Network 155 can include one or more storage, local, and/or wide area networks. Network 155 can be implemented using various topologies, communication protocols, and physical links (e.g., wireless links, coaxial cables, and the like). In some embodiments, certain components may be directly connected, as opposed to being connected via a network. For example, automation server 100 may be executing in a virtual machine, which is configured from the resources of an underlying physical computing device. The same computing device that includes the virtual machine executing automation server 100 can also include another virtual machine that executes one or more automation software targets.

Each software target can be an application, operating system, software module, software object, clustered application, or the like. Each POD is a collection of computing devices that implement software targets that work towards the same business purpose. Examples of business purposes include production, quality assurance, and test and development. Thus, POD 150(1) can be a quality assurance POD, while POD 150(2) can be a production POD. Grouping computing devices into PODs allows automation server 100 to identify software targets based upon a specified business purpose, as will be discussed in more detail below. Generally, one or more PODs can be included in a system, which can in turn operate as a data center, provide software as a service (SaaS) functionality, provide on demand computing, and the like.

Each POD can include a variety of different types of software targets. For example, a production POD can include an application server, a web server, and a database. Thus, each POD can include one or more different software targets, all of which are working towards the same business purpose.

PODs are non-overlapping; if two PODs would otherwise overlap (e.g., due to a computing device implementing both a test and development software target and a quality assurance software target), those two PODs can be merged into a single POD (e.g., a single test, development, and quality assurance POD). This allows automation server 100 to unambiguously classify each software target as working toward a particular business purpose (or group of business purposes), based upon the purpose of the POD in which that software target is included.

Information identifying each computing device that automation server 100 is to administer as well as the POD classification of each identified computing device is provided to automation server 100. The information can also include information identifying the software targets installed on each computing device. This information can be provided (e.g., via a command line interface (CLI) or graphical user interface (GUI)) to automation server 100 in an interactive fashion by an administrator, and automation server can store (e.g., in a file or database) such information for later use. Alternatively, an administrator can simply enter the information into a file or database, and store that file or database in a storage device accessible to automation server 100. The administrator can also provide the identity of the file or database to automation server 100, if needed.

In some embodiments, instead of (or in addition to) receiving input from an administrator specifying the identities of, POD classification of, and/or software targets on each computing device, automation server 100 can automatically receive and/or request such information from the computing devices. For example, an information gathering agent (not shown) can be installed on each computing device to be administered by automation server 100. When a computing device is powered on and connected to network 155, the information gathering agent installed on that computing device can obtain information identifying the computing device, its POD classification (if available), and the identities of the software targets installed on that computing device.

The information gathering agent can then send this information to automation server 100. In some embodiments, the information gathering agent sends the information as soon as the information has been collected after startup of the computing device; alternatively, the information gathering agent can send the information at a prespecified time (e.g., midnight) or in response to a request from automation server 100. The information gathering agent can also send updated information to automation server 100 (e.g., in response to a request from automation server 100, at a predetermined interval, and/or in response to detecting an event that may have caused the information to change from a prior value).

Automation server 100 includes functionality to allow users to design automated administrative activities, as well as functionality to cause those user-designed administrative activities to be performed. These administrative activities cause administrative actions to be applied to one or more of the software targets.

As will be described in more detail below, the administrative activities are composites of one or more atomic operations. When a user defines an administrative activity, the user selects the desired atomic operations making up the activity, the POD(s) in which the activity is to be performed, and then arranges the selected atomic operations in the desired order. During this process, automation server 100 can validate the selections and arrangements. Automation server 100 can then store information identifying the defined administrative activity.

To automatically cause the defined administrative activity to be performed, automation server 100 accesses the stored information in order to identify the targeted POD, the atomic operations, and the order in which to perform the atomic operations. Automation server 100 then communicates with one or more computing devices in the targeted PODs in order to cause the identified atomic operations to be performed in the identified order.

Each atomic operation performs a single business function, and thus the user can define an activity based on desired business functionality. Based upon the selected functionality and the targeted POD(s), automation server 100 can also identify the appropriate authorizations, if any, that need to be obtained before performing that business function, as described in more detail below.

Figure 2:
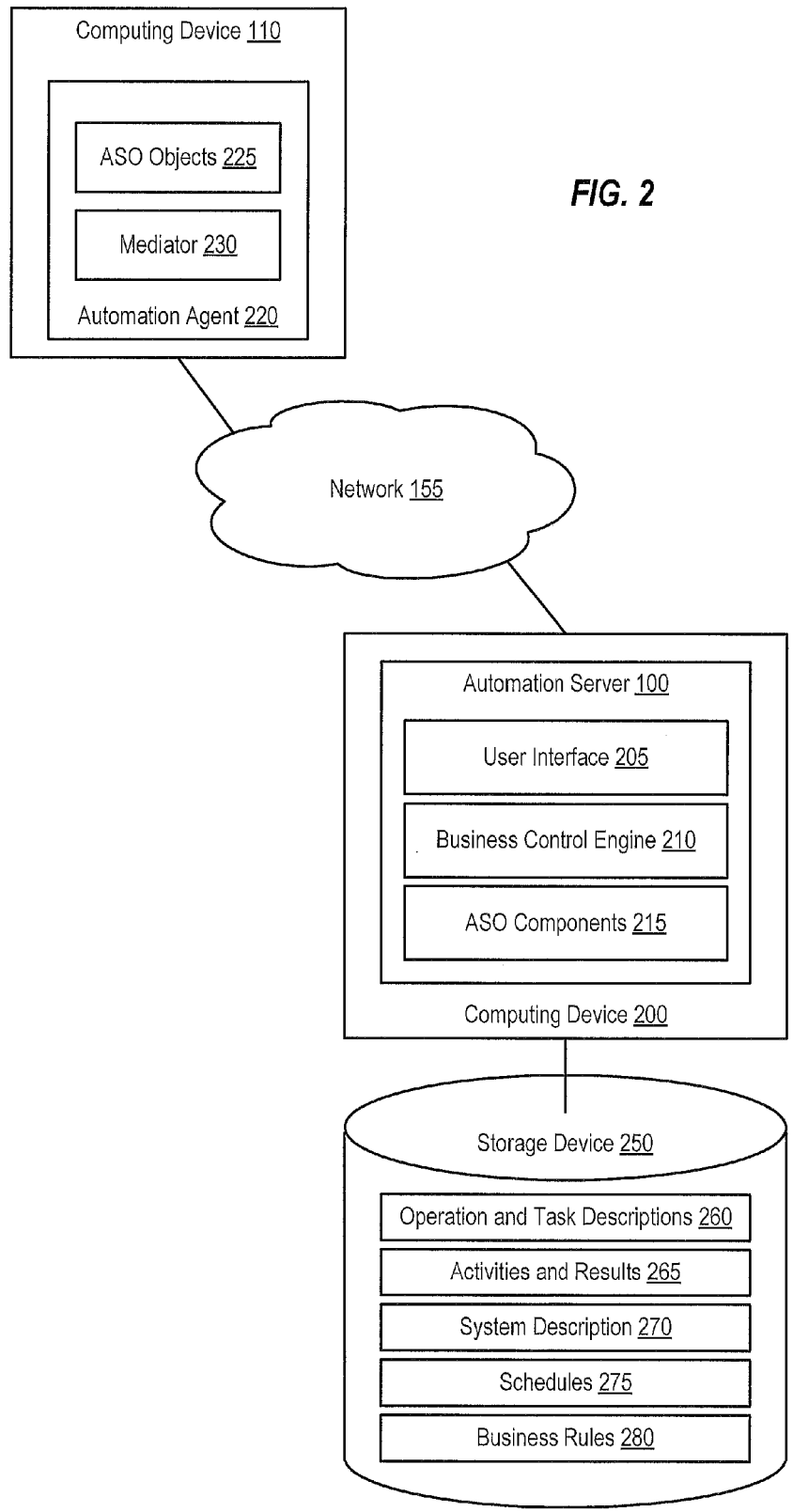
FIG. 2 is a block diagram of a software system, illustrating the components of an automation server and an automation agent, according to one embodiment of the invention.

FIG. 2 is a block diagram of a software system, illustrating the components of an automation server and an automation agent. As shown, computing device 110 (e.g., one of computing devices 110(1)-110(3) of FIG. 1) is coupled to computing device 200 by network 155. Computing device 110 implements mediator 230 and an automation agent 220, which includes one or more atomic service operation (ASO) objects 225. ASO objects 225 can be implemented as Enterprise Java Beans™ (EJBs) or other appropriate software objects.

Computing device 200 implements automation server 100. Automation server 100 includes user interface 205, business control engine 210, and ASO components 215, which can be implemented as EJBs or other appropriate software components. Computing device 200 is coupled to storage device 250. Storage device 250 provides persistent storage (i.e., storage that will persist even if storage device 250 is powered off) for various information, including operation and task descriptions 260, activities and results information 265, system description information 270, schedule information 275, and business rule information 280.

In one embodiment, automation agent 220 is implemented as an Oracle™ containers for Java™ (OCJ4) standalone container for Java™ 2 Enterprise Edition (J2EE), available from Oracle Corporation of Redwood Shores, Calif. Similarly, automation server 100 can be implemented from the Oracle™ Service Oriented Architecture (SOA) Suite and APEX™. The SOA suite can include an Oracle Application Server, an Oracle Business Process Execution Language (BPEL) Process Manager, and/or an Oracle Business Process Management (BPM) Worklist.

In one embodiment, all connections between automation server 100 and automation agents such as automation agent 220 are performed under hypertext transfer protocol secure (HTTPS) protocol and can use X.509 certificates. This allows automation activities to be performed securely.

The system of FIG. 2 is designed to allow administration of clients, such as computing device 110, based on a functional perspective. This administration is performed by allowing users to specify administrative activities, which automation server 100 will later cause to be performed for one or more clients. The administrative activities are specified as composites of (e.g., groupings of one or more) operations. Descriptions of the available operations and/or tasks (predefined composites of one or more operations, as will be described in more detail below) can be stored as operation and task descriptions 260. Each operation is an atomic business operation, and at least some operations can be implemented as ASOs. Automation server 100 allows a user to specify an administrative activity as a composite of one or more operations (described in operation and task descriptions 260) and/or tasks and to specify the clients (e.g., in terms of POD and software target type) on which that administrative activity should be performed.

Automation server 100 can store information describing the specified administrative activity in activities and results information 265. This information can indicate the administrator(s) who specified the activity, the component tasks and/or operations included in the activity, as well as the sequence in which those component tasks and/or operations are to be performed, timing information indicating when the activity (or one or more of its component tasks and/or operations) should be performed, POD information identifying the POD(s) targeted by the activity (or one or more of its component tasks and/or operations), software type information identifying the type of software target on which a particular component task and/or operation should be performed, software target information, identifying the actual software targets on which a particular component task and/or operation is to be performed, and the like.

As an activity is performed, automation server 100 also stores results of performing the activity in activities and results information 265. These results can include values obtained as the result of performing a component operation, status messages (e.g., indicating whether performance of a component operation was successful), timing information (e.g., indicating how long it took to perform an operation or when an operation was performed), and the like. Storing results allows the automation server to later display the results of successfully performed activities to a user. Additionally, storing the results allows the automation server to persist the state of the activity throughout performance of the activity, allowing restart of the activity after an execution pause or after an execution failure. Accordingly, if an activity is paused or encounters a failure (e.g., due to a target device being offline or otherwise available during execution), the automation server will maintain the state of the activity prior to being paused or failed. The automation server can later (e.g., in response to input from a user or in response to detecting that a condition that caused the pause or failure is not longer occurring) restart the activity from the exact same state and condition as were encountered just prior to the pause or failure.

System description information 270 describes the system that is administered via automation server 100. For example, system description information 270 can identify all of the computing devices in the system, the POD in which each computing device is included, and the software targets present on each computing device.

In some embodiments, at least some of system description information 270 can be automatically gathered from the clients in the system, as noted above. For example, each automation agent 220 can be configured as an information gathering agent that sends information identifying its computing device (i.e., the computing device on which that automation agent is executing) and the software present on its computing device. Later, an administrator can specify which POD includes each computing device. Alternatively, all system description information 270 can be entered manually and/or collected automatically (as opposed to having a mix of manual and automatic system description information generation, as in the prior example).

Schedule information 275 identifies the scheduling information for the system administered by automation server 100. Schedule information 275 can include information identifying scheduled downtimes, information identifying times at which certain computing devices and/or software targets are not available for administrative activities, information identifying backup windows, and the like. In general, schedule information 275 identifies times at which certain devices and/or software can be administered and/or times at which certain devices and/or software cannot be administered. Automation server 100 can use this information to validate administrative activities (e.g., by preventing administrative activities from being scheduled during times at which targets are not available) as well as to control the performance of administrative activities in a manner that complies with the schedule information.

Business rules 280 specify the particular business rules in place for each POD and/or type of software in the system to be administered. These business rules can be provided by an administrator. When an administrative activity is being specified and performed, automation server 100 can verify that the specified administrative activity complies with business rules 280. For example, when an administrative activity is specified, automation server 100 can verify that all business rules 280 are satisfied and insert additional operations into the administrative activity (e.g., to get appropriate approvals before taking certain actions), if needed to comply with business rules 280.

When it is time to begin a particular administrative activity, automation server 100 can access the information describing the administrative activity in activities and results information 265, as well as schedule information 275 and business rules 280. Automation server 100 can control the performance of the administrative activity in a manner that complies with the schedules and business rules. Performance of the administrative activity can involve sending messages (e.g., via a networking protocol, or via a service such as instant messaging or email) to various entities, including computing devices and users. For example, if an operation requests administrator approval for a shutdown, performance of the operation can involve sending an email message to the appropriate administrator, specifying the desired time and duration of the shutdown, and then waiting for a responsive email approving the shutdown request.

As noted above, some operations are implemented as ASOs. ASOs are service-oriented objects that can be executed automatically by any computing device within the system. To perform the component operations within the activity that are implemented as ASOs, automation server 100 sends messages identifying those ASOs to the automation agents on the affected clients (e.g., such as computing device 110), in the order that those ASOs are to be performed (as defined in the specified activity). In at least some embodiments, each message can specify a single ASO. When an ASO has been performed, the automation agent can send a responsive message back to the automation server. After automation server 100 detects that an ASO has been performed (e.g., in response to receiving a responsive message from the computing device performing the ASO), the automation server 100 can then initiate performance of the next operation in the administrative activity.

In one embodiment, the messages exchanged between each automation agent 220 and automation server 100 are eXtensible Markup Language (XML) messages formatted according to a definition (e.g., as provided in a Web Service Development Language (WSDL) file or other suitable interface definition). The messages can both specify the ASO to perform and one or more inputs and/or outputs to and/or from the specified ASO.

ASO components 215 and ASO objects 225 are the respective server and client software used to implement ASOs. Each ASO is configured to implement an atomic business function. To perform an ASO (e.g., in response to receiving a message specifying the ASO from automation server 100), automation agent 220 invokes the corresponding ASO object, which then interacts with the corresponding ASO component on automation server 100 to perform the business function.

In many embodiments, ASOs are designed to achieve their functionality goal in a reliable manner on all operating system platforms and conditions. Thus, before the corresponding ASO object and ASO component are deployed for use in normal administration activities, the ASO software can be thoroughly tested for each operating system platform and/or operating condition in which the ASO software is expected to operate. ASOs can also be designed to generate result diagnostics and execution log information, which indicates whether the ASOs executed successfully. Because the ASOs are so thoroughly tested, tasks and activities constructed from those ASOs need only functionality testing, not system testing. Accordingly, a user can safely configure an activity or task using ASOs, without the need to worry about whether the underlying ASOs will execute properly. The user can instead focus on making sure that the ASOs are arranged in the appropriate way to achieve the desired functionality.

Examples of operations that can be implemented as ASOs include operations such as copy file (an operation that creates a new copy of a file), delete file (an operation that deletes an existing copy of a file), terminate process (an operation cause a running process to cease execution), execute program (an operation that causes a program or other software component to begin execution), download file (an operation that obtains a copy of a file from a remote location via a network), compare file (an operation that compares one or more characteristics, such as file size, file content, file owner, file modification date, file creation date, and the like, of two or more different files), replace string in file (an operation that searches for a particular string within the contents of a file and replaces that string with another string), verify system port (an operation that determines whether a system port exists and/or is configured properly), compress file (an operation that uses a compression algorithm to compress a file, which can be performed by invoking a compression program, compression functionality provided by an operating system, or the like), and decompress file (an operation that decompresses a compressed file, which can be performed by invoking a compression program or other compression functionality). Similar operations can also be defined instead of and/or in addition to the examples provided above.

Each ASO is also independent of other operations, such that ASOs can be performed in parallel. In other words, while an ASO may receive an input value generated by another operation or need to wait to begin execution until another ASO has completed, performance of that ASO will not interfere with or be dependent upon any co-executing ASO, regardless of whether the co-executing ASO is executing on the same computing device or in a different POD.

Figures 3, 4, 5:
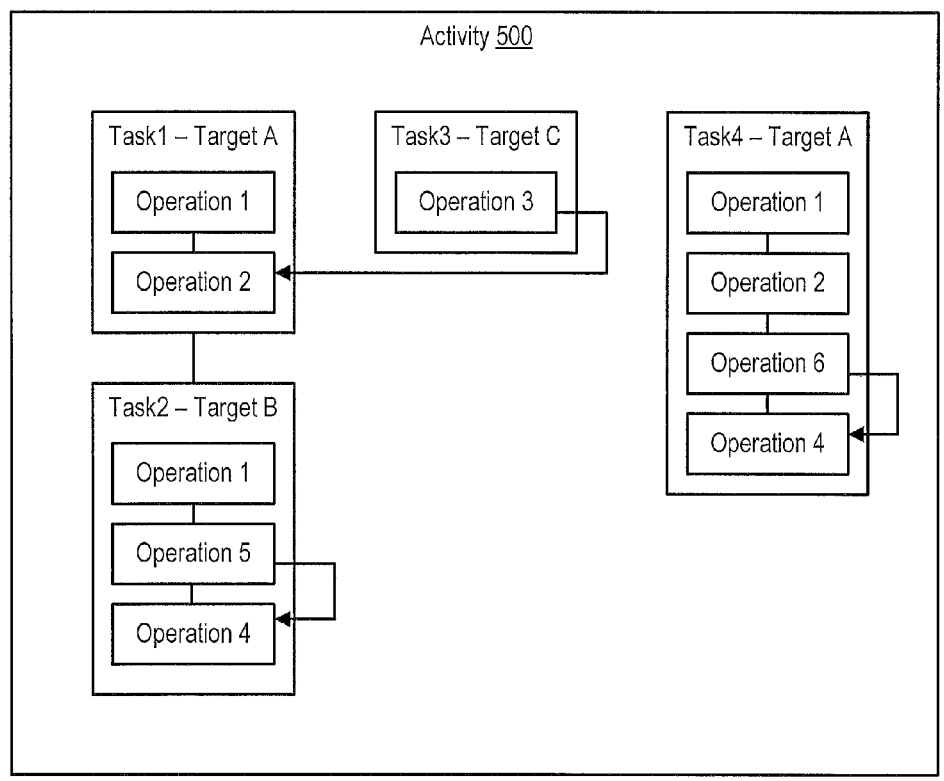
FIG. 3 illustrates how information identifying an atomic service operation can be associated with information identifying the business effects that occur when that atomic service operation is performed, according to one embodiment of the invention.
FIG. 4 is an example of a message that can be exchanged between an automation server and an automation agent on a target computing device, according to one embodiment of the invention.
FIG. 5 is a block diagram illustrating how atomic operations can be assembled into tasks and activities, according to one embodiment of the invention.

FIG. 3 illustrates how information identifying an atomic service operation can be associated with information identifying the business effects that occur when that atomic service operation is performed. This information can be stored as part of the operations and task description information 260 of FIG. 2. This information can be created by an administrator and, if desired, validated by one or more other users before being provided to the automation server.

As shown, the information includes an identifier 300 and associated effects information 305. Identifier 300 uniquely (e.g., among other ASOs) identifies an ASO. Effects information 305 identifies the business effects, if any, associated with that ASO. Zero or more effects can be identified for a given ASO. Business effects include effects such as shutdown (e.g., the software target must be stopped in order for the ASO to be performed), impact to other systems (e.g., one or more other software targets and/or computing devices must be stopped in order for the ASO to be performed), performance degradation (e.g., performance of the ASO will cause a significant reduction in performance of the software target, while the ASO is being performed), storage usage (e.g., performance of the ASO will require a certain amount of available storage), system authorization (e.g., the ASO cannot be performed without appropriate system authorization being obtained), system restart (e.g., performance of the ASO requires the software target and/or the computing device implementing the software target to be restarted), and data sensitivity access (e.g., performance of the ASO will require access to sensitive or critical data).

Effects can be identified by type, such as one of the types noted above. For example, a number or code can be associated with each type of business effect. When the information identifying an ASO is being created, an administrator can select the appropriate business effects of that ASO, causing the corresponding number or code of each selected business effect to be associated with the ASO identifier.

For at least some business effects, additional information related to the business effect can be identified. For example, if an ASO has a storage usage business effect, additional information indicating the amount of storage needed to perform the ASO can be included along with the information identifying that business effect. Similarly, if performance of an ASO has a business effect impacting other systems, the additional information can identify the other systems that will be affected (e.g., identifying that a database used by the target software system will need to be shutdown when the ASO is performed). Thus, this additional information can identify quantities (e.g., of storage), targets (e.g., software targets or other computing devices), users (e.g., identifying users whose authorization is needed), data (e.g., identifying sensitive and/or critical data, such as by file name or extension), time (e.g., the amount of time needed to perform an operation), and the like.

By maintaining information identifying the business effects of each ASO, the automation server can identify the business effects of a particular task or activity by simply collecting all of the business effects associated with any of the ASOs included within the task or activity. For example, if an activity includes four ASOs, each of which has a different business effect, the automation server can determine that the activity has the four different business effects, based upon the association of each of those business effects with a respective one of the activity's four ASOs. The automation server can then ensure that, given the business effects of the task or activity, any applicable scheduling and/or approval requirements are met.

For example, if a task or activity requires that a server be shutdown (as determined by identifying each of the business effects associated with the component ASOs within the task or activity), the automation server can access information defining the business rules (e.g., as identified in business rules information 280 of FIG. 2) for the POD(s) in which the task or activity is to be performed. If the business rules indicate that approval is needed before shutdown, the automation server can insert an operation into the task or activity that, when performed, will obtain the necessary approval prior to executing the ASO(s) that have a shutdown business effect. Similarly, the automation server can access information defining the schedules for the POD(s) in which the task or activity is to be performed. If the schedules do not allow shutdowns at certain times, the automation server can ensure that the ASO(s) that have a shutdown business effect are not executed during prohibited times. Thus, associating ASOs with business effects ultimately allows the automation server to ensure that activities and tasks are executed in a manner that complies with defined business processes.

FIG. 4 illustrates the basic structure of the messages exchanged between an automation server (e.g., automation server 100 of FIGS. 1 and 2) and an automation agent (e.g., automation client 200 of FIG. 2). As noted above, these messages can be XML messages. Each message includes an input structure 405, an ASO identifier 300, and an output structure 410.

ASO identifier 300 is a value that uniquely identifies an ASO. This value can be the same value used by to identify the ASO for other purposes (e.g., such as to correlate an ASO with a business effect, as shown in FIG. 3). ASO identifier 300 can include letters, numbers, and/or other characters.

The message can be sent from automation server to an automation agent in order to request that the automation agent cause the ASO identified by ASO identifier 300 to be executed. Similarly, after execution of the ASO identified by ASO identifier 300, the message can be sent from the automation agent to the automation server to indicate that the ASO was executed and to communicate the results, if any, of executing the ASO.

Input structure 405 is a data structure that stores all of the inputs to the ASO identified by ASO identifier 300. These inputs can include values to be processed by the ASO, status flags (e.g., generated when prior ASOs in the activity or task were performed), and the like. When the message is sent from the automation server to an automation agent, input structure 405 contains information indicating the value of each input to the identified ASO. Additionally, input structure 405 can include information identifying the name and/or type of each input value. Input structure 405 can also include one or more sequence numbers, as explained in more detail below. When a message is sent from the automation agent to the automation server after performance of the identified ASO, input structure 405 may be empty or contain indeterminate values.

In some embodiments, the same data structure is used to define all inputs to all ASOs. In other words, all messages, regardless of which ASO is identified in each message, will include the same input structure. In such embodiments, for a given message, fewer than all of the possible inputs may have values. Thus, if there are 200 possible unique inputs to all of the ASOs in use, input structure 405 can include structures to store all 200 inputs. However, if the identified ASO only uses three of those 200 inputs, only three of the 200 structures will be populated with values when the message is sent from the automation server to the automation agent.

Like input structure 405, output structure 410 is a data structure that stores all of the outputs from the ASO identified by ASO identifier 300. These outputs can include values generated by executing the ASO, status messages generated during execution of the ASO, information identifying errors or conditions encountered when executing the ASO, and the like. When the message is sent from an automation agent to the automation server, the appropriate structure(s) within output structure 410 are populated with values. When the message is sent from an automation server to an automation agent (and thus there are not yet any outputs, since the automation agent has not yet caused the identified ASO to be executed), output structure 410 may be empty or contain indeterminate values.

In some embodiments, the same data structure is used to define all outputs from all ASOs. In other words, all messages, regardless of which ASO is identified in each message, will include the same output structure. In such embodiments, for a given message, fewer than all of the possible outputs may have values. Thus, if there are 180 possible unique outputs from all of the ASOs in use, output structure 410 can include structures to store all 180 outputs. However, if the identified ASO only uses three of those 180 outputs, only three of the 180 structures will be populated with values when the message is sent from the automation agent to the automation server.

In some embodiments, the data structures used for the input and output structures are the same. Thus, the output structure received by the automation server from one automation agent can be used as the input structure that is provided to another automation agent by the automation server.

FIG. 5 is a block diagram illustrating how operations can be assembled into tasks and activities. Each operation is a specific atomic unit of functionality such as copying a file, running a SQL statement, or the like, as described above. Some operations are implemented as ASOs. Each operation can be configured to depend upon (e.g., can receive an input value from, or cannot be executed until completion of) another operation. Performance of an activity is stateful, thus allowing interdependencies across tasks running on multiple target systems.

The operations are grouped into tasks or activities via a business process perspective. The grouping of operations into tasks and/or activities is, in one embodiment, implemented through BPEL.

As used herein, a task is a collection of operations, arranged in a particular order. The operations within a task can depend upon other operations within a task, as well as upon operations in other tasks.

An activity is a set of tasks, which can be interrelated (such that some tasks can receive inputs generated by performing other tasks) and/or ordered relative to each other. The activity can be associated with a set of targets (e.g., by associating the activity with one or more PODs), and each task within the activity can be associated with one or more of those targets (e.g., by associating each task with one or more software targets or types of software targets within the POD associated with the activity).

Activities can include multiple different threads of execution. For example, a user can design an activity in which the user specifies that two or more ASOs are to be performed in parallel. Each parallel ASO can be performed using a different thread of execution.

Additionally, an activity or task can be specified as having a scope that encompasses more than one target. In such a situation, the automation server can cause multiple instances of the activity or task to be performed in parallel, such that one instance of the activity or task is performed on each target.

In one embodiment, for a given instance of a task, all operations within that task should be executed on the same target. In contrast, operations within different tasks can be executed on different targets. Thus, in such an embodiment, all of the operations in Task4 should be performed on the same target. In contrast, Task3 can be performed on a different target than Task4.

As briefly noted above, the targets of each operation can either be specified directly by the user or dynamically identified by the automation server. In the latter situation, the user can simply specify a POD and a type of software target. The automation server has access to information inventorying the PODs, including which computing devices are in each POD and the type(s) of software targets on each computing device. Based upon this information, the automation server can dynamically identify all software targets of the specified type within the specified POD. For example, if a software target is of a type "web server," the automation server can identify all of the specific web servers within the specified POD, and then cause the operation to be performed on each of the identified web servers.

Activities are flow-control driven. Thus, before initiating one ASO, the automation server determines whether all operations scheduled to be performed prior to that ASO in the activity have completed and whether all inputs that are needed by that ASO have been generated.

As shown, activity 500 includes four tasks, Task1, Task2, Task3, and Task4. Task 1 affects software target Target A and includes two operations, Operation 1 and Operation 2. Task2 affects software target Target B and includes three operations, Operation 1, Operation 5, and Operation 4. Task3 affects software target Target C and includes one operation, Operation 3. Task 4 affects software target Target A and includes four operations, Operation 1, Operation 2, Operation 6, and Operation 4.

In the illustrated activity, some tasks can be performed in parallel, while other tasks must be performed serially. As shown, tasks Task1, Task3, and Task4 can be performed in parallel. Accordingly, when activity 500 is performed, the automation server can begin performing these tasks at substantially the same time (assuming doing so would comply with any pertinent business rules or schedules).

In contrast, Task2 must be performed after completion of Task1. Thus, the automation server cannot cause Task2 to begin until all of the operations in Task1 have been performed.

Each task includes a set of operations that are performed in a particular order. Thus, to perform Task1, the automation server causes Operation 1 to be performed. Once Operation 1 has been performed, the automation server causes Operation 2 to be performed. As indicated by the arrow leading from Operation 3 of Task3 to Operation 2 of Task 1, Operation 2 of Task1 consumes one or more values generated by Operation 3 of Task 2. Thus, before Operation 2 of Task1 can be performed, Operation 3 of Task2 needs to have been performed.

Once Task1 has been performed, Task2 can be initiated. To perform Task2, the automation server causes Operation 1 to be performed. Once Operation 1 has been performed, the automation server causes Operation 5 to be performed. After Operation 5 has been performed, the automation server causes Operation 4 to be performed. As indicated by the arrow leading from Operation 5 to Operation 4, Operation 4 consumes one or more values generated by Operation 5.

To perform Task3, which contains only a single operation, the automation server causes Operation 3 to be performed. As noted above, at least part of the output of Operation 3 is provided as an input to Operation 2 of Task1.

To perform Task4, the automation server causes Operation 1 to be performed. After Operation 1 has been performed, Operation 2 is performed. Upon completion of Operation 2, Operation 6 can be performed. Once Operation 6 has finished, Operation 4, which processes one or more of the outputs generated by Operation 6, can be performed.

It is noted that in order to comply with certain business rules or schedules, certain operations may not be performed immediately after completion of a prior operation. For example, if Operation 4 has a particular business effect and the schedule for the POD in which Task2 is being performed indicates that operations having that business effect can only be performed at certain times, the automation server will not cause Operation 4 to be performed until Operation 5 has been performed and until an allowable time to perform Operation 4, as determined from the schedule for the POD.

Using a design like that shown in FIG. 5 allows users to assemble high level automation logic and execution flow through the arrangement of the component operations. In some embodiments, activities can be specified by interacting with a graphical user interface (GUI) (e.g., provided by the automation server) that provides a display much like the view shown in FIG. 5. A user can select different tasks and operations from a set of predefined tasks and/or operations (e.g., including ASOs and/or other operations), arrange the tasks and operations (e.g., by dragging icons representing the tasks and/or operations across the screen), establish dependencies between the tasks and operations (e.g., by placing connectors between tasks and/or operations), configure targets for the tasks and/or operations (e.g., by entering information identifying one or more PODs, software target types, software targets, and the like), and the like. For example, the user can select an operation from a menu of predefined operations, insert the operation into an existing task, and optionally define relationships between the outputs of another operation and the inputs of the new operation (e.g., indicating that a date generated by another operation should be used as an input to the new operation).

As noted above, activities are designed based on functionality. A designer simply selects ASOs or other operations that implement desired functions, without needing to understand the underlying implementation of those ASOs. In at least some embodiments, during the design process, the automation server's user interface can control the selection options, such that, at a given point in an activity, the user can only select appropriate ASOs. For example, the user interface can limit the selectable ASOs to those that can be performed at that point in the activity without violating business rules and that do not depend upon a previous ASO (not already specified in the activity) having already been performed. Similarly, the user interface can control dependencies such that a user cannot specify an output value of one type (e.g., string) as an input value of another type (e.g., integer).

In one embodiment, all of the ASOs are reusable and interoperable among each other. In other words, the ASOs can be arranged in any order by a user without causing an error. This feature can be enabled by using a common input and output structure, as described above with respect to FIG. 4.

FIG. 6A shows how sequence numbers can be included in input and output structures included in messages exchanged between automation servers and automation agents. As shown, a given structure can include a sequence number 605 and a key name 610. The key name 610 can be associated with one or more properties and a value of each property value. Here, key name 610 is associated with four properties, property 615(1), property 615(2), property 615(3), and property 615(4). Key name 610 is also associated with value 620(1) of property 615(1), value 620(2) of property 615(2), value 620(3) of property 615(3), and value 620(4) of property 615(4).

FIG. 6B illustrates how specific values can be included in the structure shown in FIG. 6A. As shown, sequence number "01" has been inserted into the sequence number structure 605. The key name now has a specific value, "/app/myfile1.txt", which is inserted into the key name structure 610(1). Properties 615(1)-615(4) identify specific properties of the file identified by the key name property 615(1) is an owner property, property 615(2) is a group property, property 615(3) is a size property, and property 615(4) is a property whose value indicates when the file was last modified.

Here, each property has also been assigned a value. The value of owner 615(1) is root 620(1)(1) (the first number in parentheses indicates the corresponding key, 610(1), while the second number in parentheses indicates the corresponding property, owner 615(1)). The value of group 615(2) is root 620(1)(2). The value of size 615(3) is 1032 620(1)(3). The value of the last modified property 615(4) is 10/02/2008 602(1)(4).

FIG. 7 illustrates how automation server can use sequence numbers to keep track of values generated by performing same atomic service operation in different tasks. This can be used when multiple targets are specified for a given task, such that the automation server causes several instances of that task to execute at that same time, each on a different target.

Here, there are three key names, each of which is associated with a different set of the same data. Each set of data includes the same four properties: owner 615(1), group 615(2), size 615(3), and last modified 615(4).

For ease of illustration, each property name is used to label a column in FIG. 7, and the different values of a given property included in each set of data are included below the property name in that column. Accordingly, all values of the owner property 615(1) are shown in the first column. The value root 620(1)(1) is thus a value of owner property 615(1) for key name "/app/myfile1.txt" 610(1). Similarly, the value root 620(2)(1) is the value of owner property 615(1) for key name "/app/myfile2.txt" 610(2). The value root 620(3)(1) is the value of owner property 615(1) for key name "/app/myfile2.txt" 610(3).

There are three values of group property 615(2): root 620(1)(2) (associated with key name "/app/myfile1.txt" 610(1)), root 620(2)(2) (associated with key name "/app/myfile2.txt" 610(2)), and root 620(3)(2) (associated with key name "/app/myfile2.txt" 610(3)). Similarly, there are three values of size property 615(3): 1032 620(1)(3) (associated with key name "/app/myfile1.txt" 610(1)), 1211 620(2)(3) (associated with key name "/app/myfile2.txt" 610(2)), and 896 620(3)(3) (associated with key name "/app/myfile2.txt" 610(3)). There are also three values of last modified property 615(4): 10/02/2008

620(1)(4) (associated with key name "/app/myfile1.txt" 610(1)), 1/23/2009 620(2)(4) (associated with key name "/app/myfile2.txt" 610(2)), and 3/01/2009 620(3)(4) (associated with key name "/app/myfile2.txt" 610(3)).

A different key name is used to label each row in FIG. 7, and the values associated with that key name are included in the same row as the key name. Each row thus makes up a set of data.

Key names 610(2) and 610(3) have the same value ("/app/myfile2.txt") but identify different data sets. Accordingly, different sequence numbers can be used to distinguish the two data sets. For example, sequence number "02" can be associated with key name 610(2) and its associated values 620(2)(1), 620(2)(2), 620(2)(3), and 620(2)(4). Similarly, sequence number "03" can be associated with key name 610(3) and its associated values 620(3)(1), 620(3)(2), 620(3)(3), and 620(3)(4).

Thus, the different sets of data can be distinguished by the use of different sequence numbers and/or key names. Thus, each property and value in the set of data associated with key name 610(1) can be associated with a first sequence number (which is also associated with key name 610(1)), the set of data associated with key name 610(2) can be associated with a second sequence number (again, also associated with key name 610(2)), and the set of data associated with key name 610(3) can be associated with a third sequence number (also associated with key name 610(3)).

Associating the sequence numbers with the data contained in the input and output structures allows the automation server to distinguish between the same set of outputs generated by executing the same operation on different targets, and to pass the correct set of outputs as inputs to a subsequent operation. For example, if a given task is performed on each of several targets, all of the operations within the task will be performed on all of the targets. The automation server can associate a different sequence number with each instance of the task, such that the sequence numbers can be used to differentiate between outputs generated by performing the task on the different targets.

Similarly, the automation server can associate the same sequence number with fields in both input and output structures in order to link values that are generated by one ASO and consumed by another. For example, if the set of data identified by key name 610(3) is generated by a first ASO and then consumed by a second ASO, the automation server can associate sequence number "03" (the sequence number associated with the set of data identified by key name 610(3)) with both the fields in an output structure provided with the request to execute the first ASO and also the fields in an input structure provided with the request to execute the second ASO.

Accordingly, the sequence numbers can be used to link outputs from one ASO to inputs of another in order to effect dependencies between ASOs. Thus, when generating an input structure for use in invoking an ASO, the automation server can determine whether to use an existing sequence number (and if so, which existing sequence number to use) or to use a new sequence number, depending upon whether the ASO to be invoked depends on values generated by another ASO. If no dependencies exist, the automation server can use all new sequence numbers for the input structure. If dependencies do exist, however, the automation sever can use the appropriate sequence number(s) associated with the output structure(s) of the ASOs upon which the new ASO depends.

Figure 8:
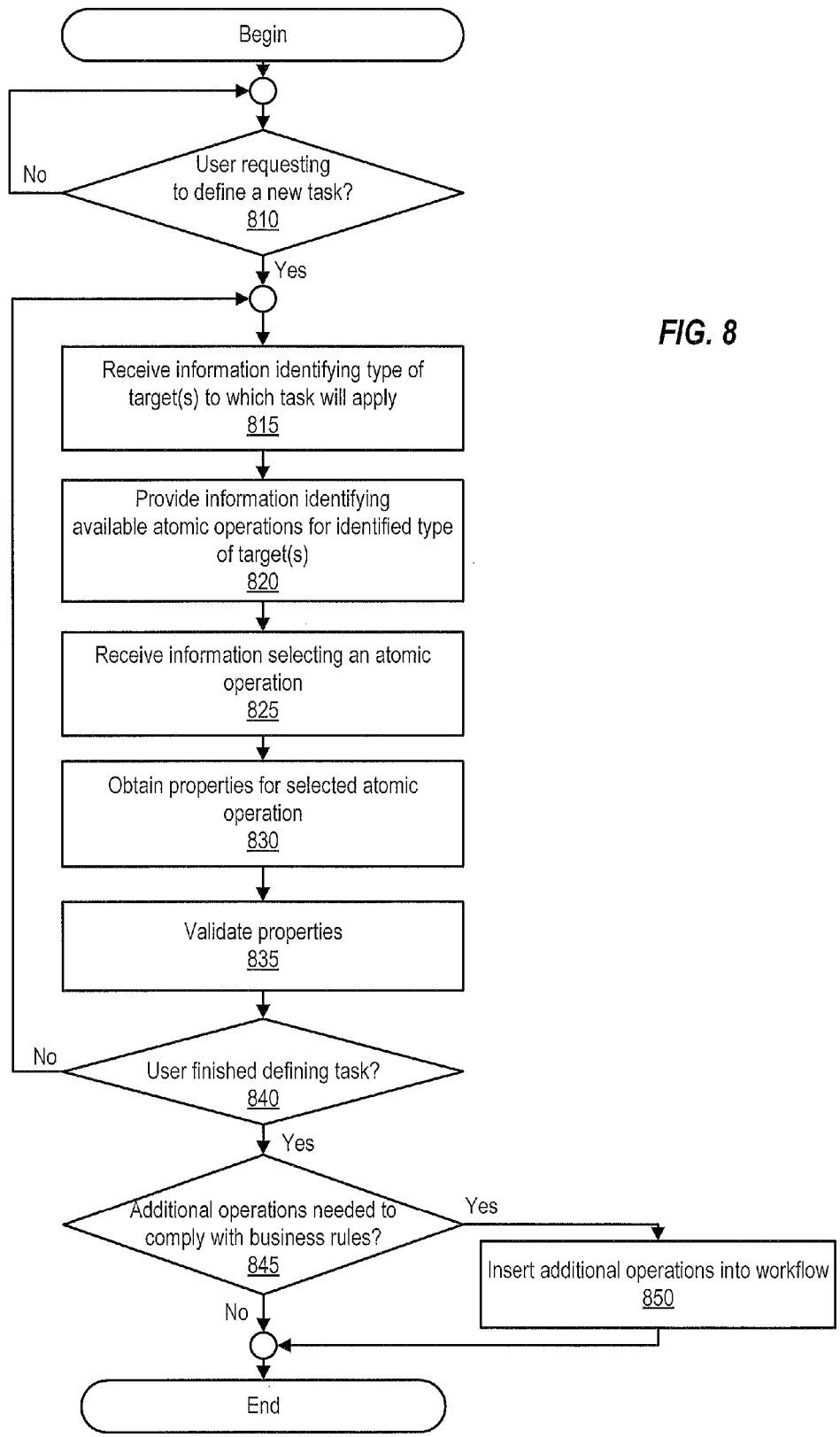
FIG. 8 is a flowchart illustrating how a task can be created from one or more atomic service operations, according to one embodiment of the invention.

FIG. 8 is a flowchart illustrating how a task can be created from one or more atomic service operations. This method can be performed by an automation server such as automation server 100 of FIGS. 1 and 2.

The method begins at 810. Once a user requests to define a new task (e.g., by selecting an option to create a new task from a GUI), the user can be prompted (not shown) for information identifying a type (or set of types) of software target to which the task will apply. Responsive information is received from the user, as indicated at 815. This information can indicate, for example, that all Outlook™ servers are targets of the new task. Similarly, the information can indicate that all file servers are targets of the new task.

At 820, the user is provided with information (e.g., by displaying a menu or list to the user) identifying the available operations for the identified type(s) of target. The user can select one of these operations (e.g., by clicking on the selected operation with a mouse). Information indicating the selected operation is received from the user, as indicated at 830.

The user can then provide properties for the selected atomic operation. Providing properties can involve actions like indicating the order in which the selected atomic operation should be performed, relative to one or more other atomic operations; establishing dependencies between the selected atomic operation and other operations; inputting static input values to be consumed by the selected atomic operation; specifying outputs generated by other operations as inputs to the selected atomic operation; and the like. In response to receiving these properties (at 830), the properties can be validated (e.g., to make sure the properties do not violate a business rule, schedule, or the like), as shown at 835. If validation fails, an error message can be provided to the user and the user can be prompted for valid properties.

If the user is not yet finished defining the task (as detected at 840), control returns to 815, where the user can continue to edit the task and to add operations to the task. If the user has finished defining the task (e.g., as determined by detecting the user's selection of a finished or complete icon or the like), a determination is made as to whether any additional operations are needed to comply with business rules for the POD containing the targets to which the task will apply, as indicated at 845.

Performing operation 845 can involve accessing information identifying the business effects (e.g., as shown in FIG. 3) of each operation selected at 825 for inclusion in the task, and then accessing information identifying one or more business rules and/or one or more schedules. If additional operations are needed to comply with the business rules, one or more additional operations (e.g., such as emailing or otherwise contacting an administrator to get approval) can be inserted into the workflow, as shown at 850. For example, if one of the operations causes a shutdown, and the business rules indicate that shutdowns are not allowed without administrator approval, an operation that emails the administrator to obtain the needed approval can be inserted into the workflow.

Figure 9:
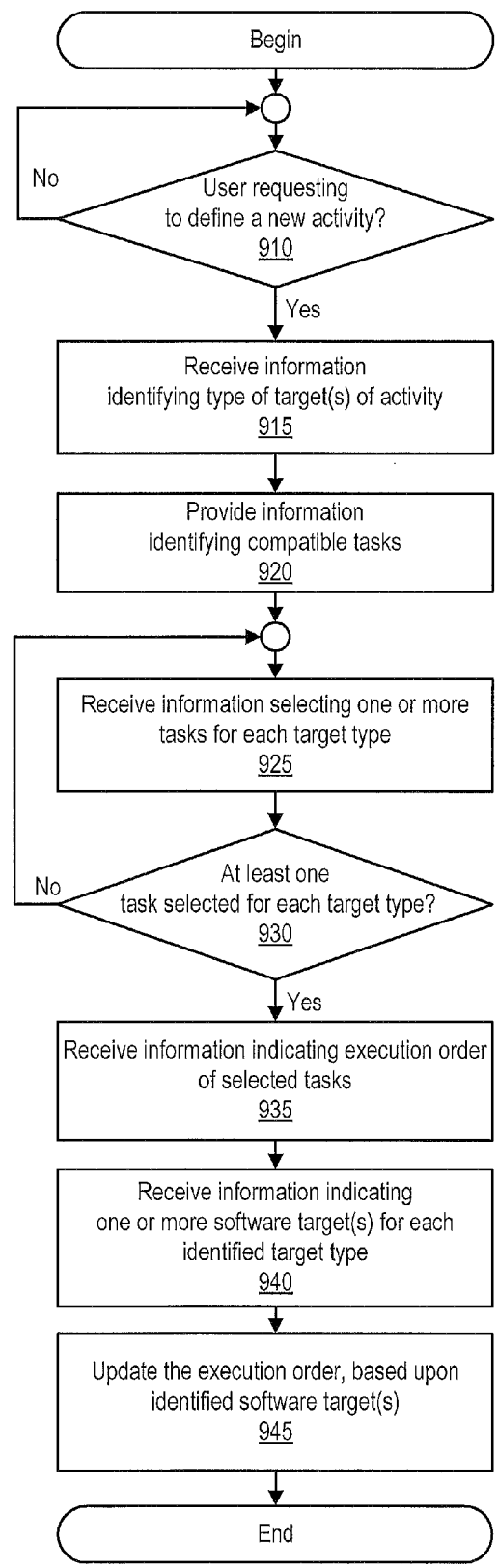
FIG. 9 is a flowchart illustrating how an activity can be created from one or more tasks, according to one embodiment of the invention.

FIG. 9 is a flowchart illustrating how an activity can be created from one or more tasks. Like the method of FIG. 8, this method can be performed by an automation server like the one shown in FIGS. 1 and 2.

The method begins when a determination is made as to whether a user is requesting to define a new activity, as shown at 910. A user can request to define a new activity by performing an action like selecting an icon corresponding to the creation of new activities.

Once the user has selected to create a new activity, information identifying the type of software targets (e.g., specified in the same manner as operation 815 of FIG. 8) to which the activity will apply can be received, as shown at 915. In response to this information, a list of compatible tasks (i.e., tasks that can be performed on the specified type of software targets, as determined by the software target type, indicated at 815 of FIG. 8, provided for each task) is displayed or otherwise provided to the user, as shown at 920. These tasks can be tasks that were previously created by the user (e.g., using the method of FIG. 8) or predefined tasks. In some embodiments, the user may also be presented with the option of creating a new task instead of selecting an existing task.

At 925, information selecting one or more tasks for each target type is received from the user. Thus, for each software target type specified by the user at 915, at least one task should be selected at 925. If at least one task has not been selected for each target type, the process waits for the user to complete selection of the tasks, as indicated at 930 and 925.

At 935, information indicating the execution order of the selected tasks is received, as shown at 935. This information can be received from the user when the user manipulates the placement of icons or other graphics representing the tasks in a GUI relative to each other.

Information indicating one or more software targets for each identified target type is received at 940. This information can be received directly from the user (e.g., in the form of information that statically specifies the software targets to which this activity should apply) or generated dynamically. To cause the information to be generated dynamically, the user can specify one or more PODs at 940. Based upon this information, an automation server can access a list of software targets within the specified PODs (as noted above, such information can be collected dynamically or manually entered by an administrator). The automation server can then identify all the software targets of the specified type within the specified POD(s). Thus, if the user indicates that a particular task within the activity should be performed on all email servers, and if the user specifies a particular POD, the automation server can identify all of the email servers currently within the specified POD as targets of the task.

Based upon the identified targets, the execution order of the selected tasks can be modified to comply with any restrictions on scheduling or the like for those targets. For example, if two tasks do not depend on each other and a first task needs to wait on an administrator's approval while the second does not, the automation server may move execution of the second task forward in time while moving the execution of the first task later in time.

Figure 10:
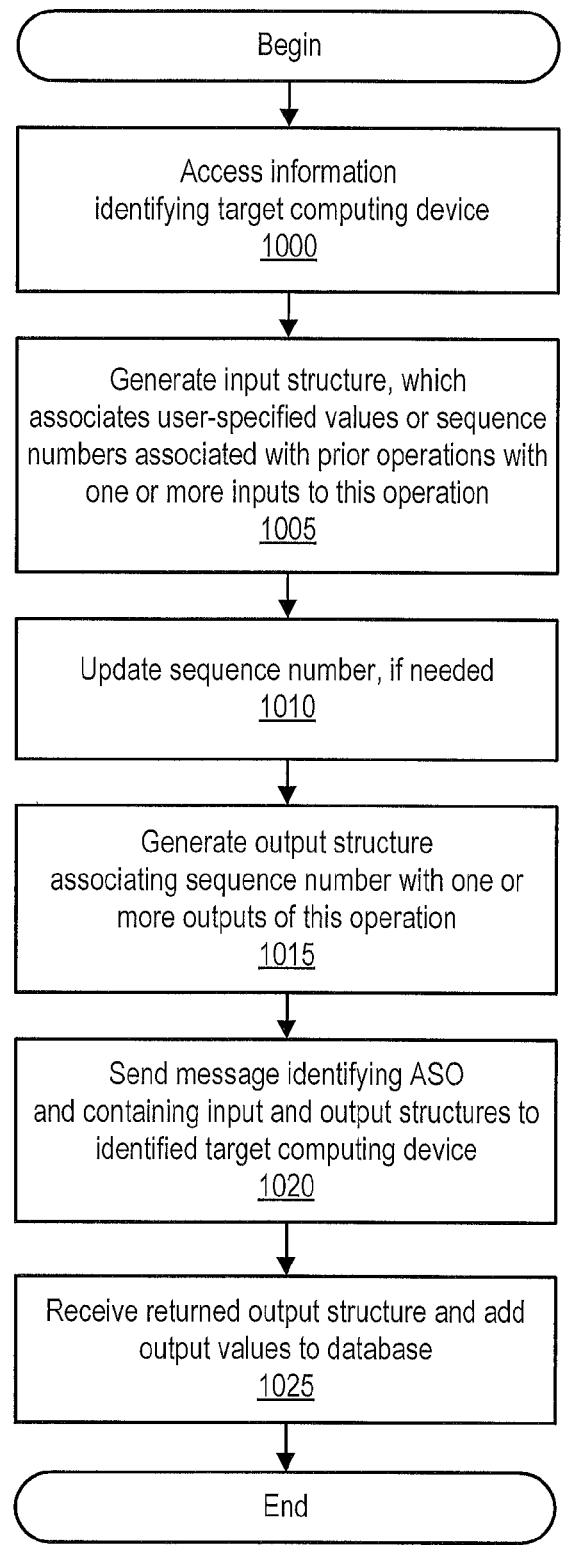
FIG. 10 is a flowchart illustrating how an automation server can cause an atomic service operation to be performed by a target computing device, according to one embodiment of the invention.

FIG. 10 is a flowchart illustrating how an automation server can cause an atomic service operation to be performed by a target computing device. This method can be performed by an automation server like the one shown in FIGS. 1 and 2.

The method of FIG. 10 begins at 1000, when information identifying a target computing device is accessed. In some embodiments, this information has already been generated (e.g., at the time that an activity containing the operation was defined) prior to the time at which operation 1000 is performed. In other embodiments, this information is generated dynamically. For example, operation 1000 can be performed by identifying the type of target(s) to which the task including the operation applies and then identifying the PODs to which the activity including the operation applies. The actual targets of the identified type within the identified PODs can then be identified. The computing devices that implement those targets are then identified.

At 1005, an input structure (e.g., as shown in FIG. 3) is generated. This input structure associates user-specified values or sequence numbers associated with prior (in terms of execution order) operations with the inputs to the operation, if any, as described above. If the sequence number needs to be updated (e.g., before the output structure for this operation and/or subsequent input structures for other operations are generated), the sequence number can be updated, as shown at 1010.

As noted above, the sequence number can be updated if the ASO uses input values that do not depend on any output values generated by prior (in execution order) ASOs. If instead the ASO consumes values generated by a prior ASO, the sequence number associated with the previously generated output values (this association can be present in an output structure sent to the prior ASO) is used as the sequence number for the appropriate input to the new ASO. It is noted that an input structure can include several different sequence numbers, each associated with one or more different input fields included in the input structure. Similarly, each output structure can also include one or more different sequence numbers.

An output structure is also generated, as shown at 1015. The output structure associates the sequence number with one or more outputs of the operation. By associating the sequence number with the inputs and outputs (e.g., in a manner similar to that described above with respect to FIGS. 6A, 6B, and 7), correlations between outputs of operations that are input to other operations can be defined. For example, if operation 1 generates an output that is used as an input by operation 2, the same sequence number can be assigned to the output value of operation 1 and the input value of operation 2.

At 1020, a message identifying the ASO and containing the input and output structures generated at 1005 and 1015 is sent to the identified target computing device. This causes the receiving computing device to execute the ASO identified in the message, using the inputs, if any, included in the input structure of the message.

At 1025, a message containing the output structure is received from computing device. This output structure includes the sequence numbers discussed above, as well as one or more values generated by the identified operation. These values can be stored (e.g., in a database) and/or used as input to one or more subsequent operations.

Figure 11:
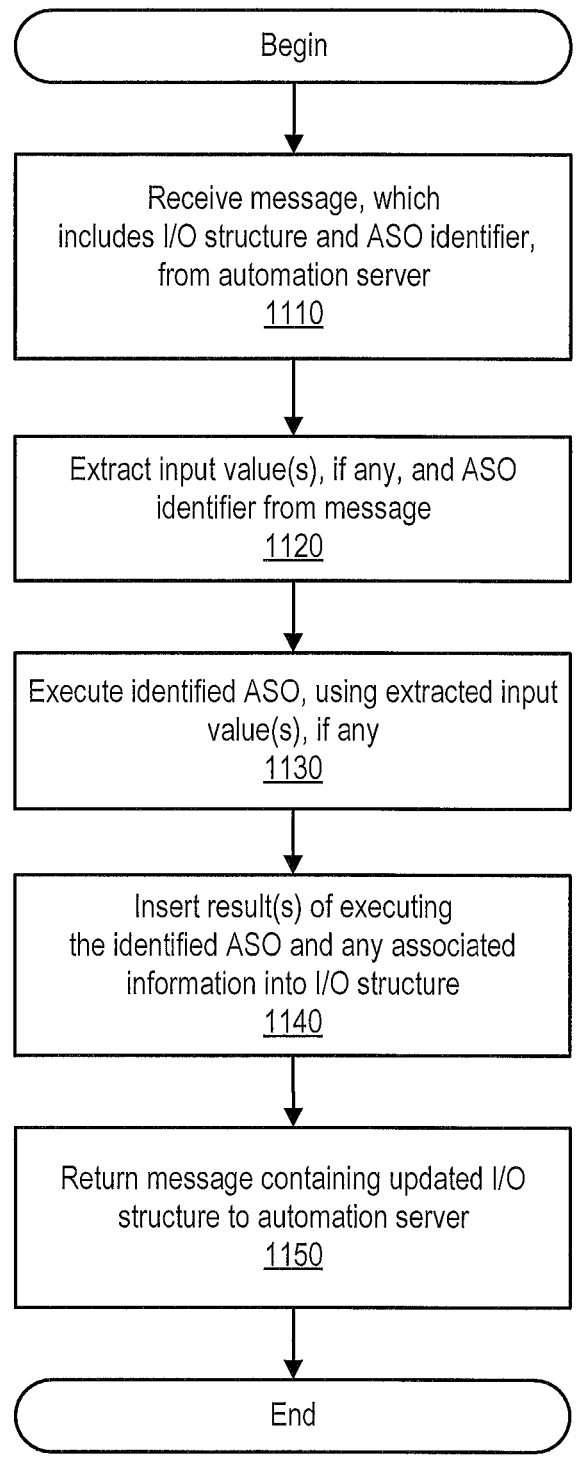
FIG. 11 is a flowchart illustrating how a target computing device can perform an atomic service operation, according to one embodiment of the invention.

FIG. 11 is a flowchart illustrating how a target computing device can perform an atomic service operation. This method can be performed by an automation agent like the one shown in FIG. 2.

The method of FIG. 11 begins when a message, which includes input and output structures and an ASO identifier, is received from an automation server, as shown at 1110. In response to receiving the message, the ASO identifier and one or more input values in the input structure (if any such values are included) are extracted from the message (1120). The identified ASO is then executed, using the extracted input values, if any, as shown at 1130. The results of executing the identified ASO, including any diagnostic or error information as well as any output values generated when executing the identified ASO, are inserted into the output structure of the message, as shown at 1140. The modified message containing the populated output structure is then returned to the automation server, as indicated at 1150.

It is noted that the operations described in FIGS. 8-11 are provided as examples, and that other operations can be included instead of and/or in addition to the operations described above. Similarly, some operations may be performed in a different order than shown and described above. Additionally, some operations may be omitted from some embodiments.

Figure 12:
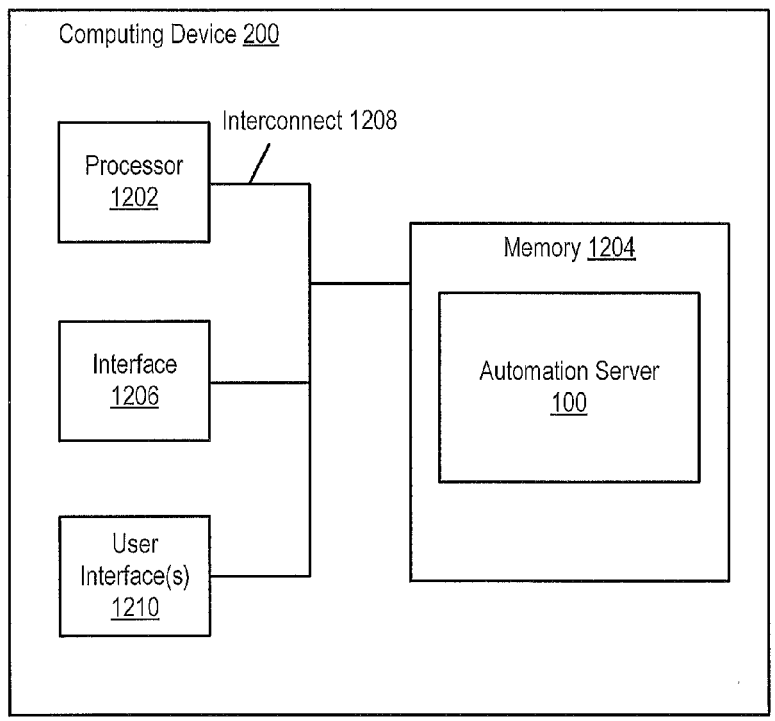
FIG. 12 is a block diagram of computing device that implements an automation server, according to one embodiment of the invention.

FIG. 12 is a block diagram of computing device 200 that implements an automation server, illustrating how an automation server 100 (e.g., automation server 100 of FIGS. 1 and 2) can be implemented in software. By executing the software that implements automation server 100, computing device 200 becomes a special purpose computing device that is configured to perform automated administration of software targets, using composites of atomic operations.

Computing device 200 can be a personal computer, network appliance, server, personal digital assistant, mobile phone, storage controller (e.g., an array controller, tape drive controller, or hard drive controller), laptop computer, or the like. In general, computing device 200 is configured to execute software or otherwise provide appropriate functionality to act as a component of the system described herein.

As illustrated, computing device 200 includes one or more processors 1202 (e.g., microprocessors, programmable logic devices (PLDs), or application specific integrated circuits (ASICs)) configured to execute program instructions stored in memory 1204. Memory 1204 can include various types of computer readable storage media such as RAM, Read Only Memory (ROM), Flash memory, micro electro-mechanical systems (MEMS) memory, magnetic core memory, and the like. Memory 1204 can include both volatile and non-volatile memory. In this example, program instructions and data executable by processors 1202 to implement all or part of automation server 100 are stored in memory 1204.

Computing device 200 also includes one or more interfaces 1206 and one or more user interface(s) 1210. Processor 1202, interface 1206, user interface(s) 1210, and memory 1204 are coupled to send and receive data and control signals by a bus or other interconnect 1208.

Interface 1206 can include a network interface to various networks (e.g., such as network 155 of FIGS. 1 and 2) and/or interfaces to various peripheral buses. For example, interface 1206 can include a network interface (e.g., implemented as a network interface card) via which messages generated by automation server 100 can be sent to other devices (e.g., such as a computing device 110 of FIG. 13) in order to cause an ASO to be executed for a software target implemented on the other computing device. Messages sent by an automation agent to the automation server can also be received via such a network interface. Interface 1206 can also include an interface to one or more storage devices (e.g., such as storage device 250 of FIG. 2 on which the information such as atomic server operations 260, activities and results 265, system description 270, schedules 275, and/or business rules 280 is stored).

User interfaces 1210 can include one or more of a variety of different human user input and/or output devices, and/or one or more interfaces to such input and/or output devices. Such input and/or output devices can include monitors or other displays, keyboards, keypads, mice, electronic tablets, touch screens, audio speakers, and the like. Input (e.g., requesting to define a task or activity, or to edit a previously-defined task or activity) to and output from (e.g., indicating the execution process of a task or activity, and/or results generated during performance of a task or activity) automation server 100 can be received and/or sent via such an input and/or output device.

The program instructions and data implementing automation server 100 can be stored on various computer readable storage media such as memory 1204. In some embodiments, such software is stored on a computer readable storage medium such as a compact disc (CD), digital versatile disc (DVD), hard disk, optical disk, tape device, floppy disk, and the like). In order to be executed by processor 1202, the instructions and data can be loaded into memory 1204 from the other computer readable storage medium. The instructions and/or data can also be transferred to computing device 200 for storage in memory 1204 via a network such as the Internet or upon a carrier medium.

Figure 13:
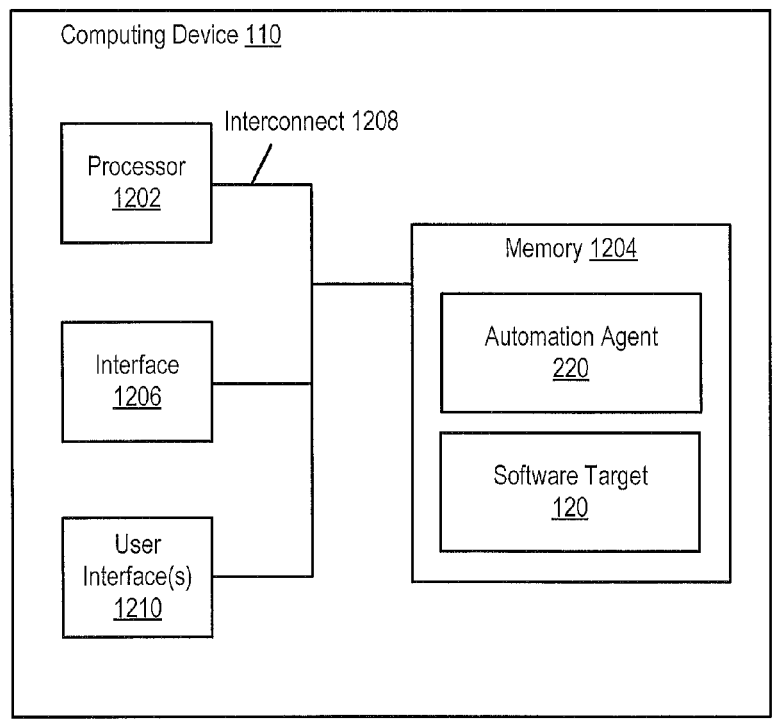
FIG. 13 is a block diagram of a target computing device, according to one embodiment.

FIG. 13 is a block diagram of a target computing device, illustrating how an automation agent 220 (e.g., automation agent 220 of FIG. 2) can be implemented in software. By executing the software that implements automation agent 220, computing device 110 becomes a special purpose computing device that is configured to exchange messages with an automation server and to execute ASOs in response to messages received from the automation server.

Computing device 110 can be a personal computer, network appliance, server, personal digital assistant, mobile phone, storage controller (e.g., an array controller, tape drive controller, or hard drive controller), laptop computer, or the like. In general, computing device 120 is configured to execute software or otherwise provide appropriate functionality to act as a component of the system described herein.

Like computing device 200, computing device 110 includes one or more processors 1202 (e.g., microprocessors, programmable logic devices (PLDs), or application specific integrated circuits (ASICs)) configured to execute program instructions stored in memory 1204. Memory 1204 can include various types of computer readable storage media such as RAM, Read Only Memory (ROM), Flash memory, micro electro-mechanical systems (MEMS) memory, magnetic core memory, and the like. Memory 1204 can include both volatile and non-volatile memory. Software implementing automation agent 220 and a software target 120 is stored in memory 1204 of computing device 110.

Computing device 110 also includes one or more interfaces 1206. Processor 1202, interface 1206, and memory 1204 are coupled to send and receive data and control signals by a bus or other interconnect.

Interface 1206 can include a network interface to various networks (e.g., such as network 155 of FIGS. 1 and 2) and/or interfaces to various peripheral buses. For example, interface 1206 can include a network interface (e.g., implemented as a network interface card) via which messages generated or modified by automation agent 220 can be sent to an automation server and messages generated by an automation server can be received by computing device 110. Interface 1206 can also include an interface to one or more storage devices (e.g., on which the messages and/or temporary results of executing an ASO are stored).

User interfaces 1210 can include one or more of a variety of different human user input and/or output devices, and/or one or more interfaces to such input and/or output devices. Such input and/or output devices can include monitors or other displays, keyboards, keypads, mice, electronic tablets, touch screens, audio speakers, and the like.

The program instructions and data implementing automation agent 220 and software target 120 can be stored on various computer readable storage media such as memory 1204. In some embodiments, such software is stored on a computer readable storage medium such as a compact disc (CD), digital versatile disc (DVD), hard disk, optical disk, tape device, floppy disk, and the like). In order to be executed by processor 1202, the instructions and data can be loaded into memory 1204 from the other computer readable storage medium. The instructions and/or data can also be transferred to computing device 110 for storage in memory 1204 via a network such as the Internet or upon a carrier medium.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
accessing information describing an activity, wherein
the activity comprises a plurality of operations,
the plurality of operations comprises a first operation,
the information comprises
an identity of a first domain of a plurality of domains,
an identity of a first type of software target of a plurality of types of software targets,
business effect information regarding one or more business effects, if any, associated with the first operation, and
resource information indicating resources used to perform the first operation, if the information comprises the business effect information, and
the each of the plurality of domains comprises a respective set of one or more computing devices; and
identifying an identified plurality of computing devices, wherein
the identified plurality of computing devices are among a plurality of computing devices included in the first domain,
each of the identified plurality of computing devices currently implement the first type of software target, and
the accessing and the identifying are performed by an automation server.

2. The method of claim 1, further comprising:
sending a message to the each of the identified plurality of computing devices, wherein
the automation server is coupled to the plurality of computing devices via a network,
the message is sent via the network,
the message causes each of the identified plurality of computing devices to perform the first operation, and
the sending is performed by the automation server.

3. The method of claim 1, further comprising:
performing the activity;
maintaining a state of the activity; and
if there is a pause or a failure when performing activity,
restarting the activity from the state of the activity prior to the pause or the failure.

4. The method of claim 2, further comprising:
accessing information identifying a schedule for the first domain; and
delaying performance of at least one operation within the activity, in order to comply with the schedule for the first domain.

5. The method of claim 2, further comprising:
receiving user input specifying the activity; and
validating the activity, wherein
the validating comprises
determining whether each operation included in the activity complies with a set of business rules.

6. The method of claim 2, further comprising:
generating a sequence number; and
generating an output structure for the first operation, wherein
the output structure associates the sequence number with an output value generated by the first operation.

7. The method of claim 6, further comprising:
generating an input structure for a second operation of the plurality of operations, wherein
the input structure associates the sequence number with an input value consumed by the second operation.

8. The method of claim 7, further comprising:
receiving user input specifying the activity; and
validating the activity, wherein
the validating comprises
verifying that a data type of the input value consumed by the second operation is a same data type as a data type of the output value generated by the first operation.

9. The method of claim 2, further comprising:
presenting a plurality of options for specifying the activity, wherein
the plurality of options comprise
an option to specify a type of software target to which the activity applies, and
an option to specify one or more operations to be included in the activity.

10. The method of claim 7, further comprising:
sending a plurality of messages identifying the first operation to a plurality of automation agents, wherein
each automation agent is implemented on a different computing device, and
an input structure of each of the plurality of messages comprises at least one different sequence number than each of the other plurality of messages.

11. A system comprising:
a processor;
a network interface; and
a computer-readable storage medium, wherein
the computer-readable storage medium stores program instructions executable by the processor to implement an automation server, wherein the automation server is configured to
access information describing an activity, wherein
the activity comprises
a plurality of operations,
the plurality of operations comprises
a first operation,
the information comprises
an identity of a first domain of a plurality of domains,
an identity of a first type of software target of a plurality of types of software targets,
business effect information regarding one or more business effects, if any, associated with the first operation, and
resource information indicating resources used to perform the first operation, if the information comprises the business effect information, and
the each of the plurality of domains comprises a respective set of one or more computing devices, and
identify an identified plurality of computing devices, wherein
the identified plurality of computing devices are among a plurality of computing devices included in the first domain, and
each of the identified plurality of computing devices currently implement the first type of software target.

12. The system of claim 11, wherein the automation server is further configured to:
send a message to the each of the identified plurality of computing devices, wherein
using the network interface, the automation server is configured to be coupled to the plurality of computing devices via a network,
the message is sent via the network interface, and
the message is configured to cause each of the identified plurality of computing devices to perform the first operation.

13. The system of claim 11, wherein the automation server is further configured to:
- access information identifying a schedule for the first domain; and
- delay performance of at least one operation within the activity, in order to comply with the schedule for the first domain.

14. The system of claim 11, wherein the automation server is further configured to:
- receive user input specifying the activity; and
- validate the activity, wherein
  - the automation server is configured to validate the activity by virtue of being configured to
    - determine whether each operation included in the activity complies with a set of business rules.

15. The system of claim 11, wherein the automation server is further configured to:
- present a plurality of options for specifying the activity, wherein
  - the plurality of options comprise
    - an option to specify a type of software target to which the activity applies, and
    - an option to specify one or more operations to be included in the activity.

16. A non-transitory computer readable storage medium comprising program instructions executable to implement an automation server, wherein the automation server is configured to:
- access information describing an activity, wherein
  - the activity comprises
    - a plurality of operations,
  - the plurality of operations comprises
    - a first operation,
  - the information comprises
    - an identity of a first domain of a plurality domains, and
    - an identity of a first type of software target of a plurality of types of software targets,
    - business effect information regarding one or more business effects, if any, associated with the first operation, and
    - resource information indicating resources used to perform the first operation, if the information comprises the business effect information, and
  - the each of the plurality of domains comprises a respective set of one or more computing devices; and
- identify an identified plurality of computing devices, wherein
  - the identified plurality of computing devices are among a plurality of computing devices included in the first domain, and
  - each of the identified plurality of computing devices currently implement the first type of software target.

17. The non-transitory computer readable storage medium of claim 16, wherein the automation server is further configured to:
- send a message to the each of the identified plurality of computing devices, wherein
  - the automation server is configured to be coupled to the plurality of computing devices via a network,
  - the message is sent via the network, and
  - the message is configured to cause each of the identified plurality of computing devices to perform the first operation.

18. The non-transitory computer readable storage medium of claim 16, wherein the automation server is further configured to:
- access information identifying a schedule for the first domain; and
- delay performance of at least one operation within the activity, in order to comply with the schedule for the first domain.

19. The non-transitory computer readable storage medium of claim 16, wherein the automation server is further configured to:
- receive user input specifying the activity; and
- validate the activity, wherein
  - the automation server is configured to validate the activity by virtue of being configured to
    - determine whether each operation included in the activity complies with a set of business rules.

20. The non-transitory computer readable storage medium of claim 16, wherein the automation server is further configured to:
- present a plurality of options for specifying the activity, wherein
  - the plurality of options comprise
    - an option to specify a type of software target to which the activity applies, and
    - an option to specify one or more operations to be included in the activity.

* * * * *